(12) United States Patent
Xue

(10) Patent No.: US 10,054,451 B2
(45) Date of Patent: Aug. 21, 2018

(54) INTERACTIVE DYNAMIC CLOUD NAVIGATION SYSTEM

(71) Applicant: Junhua Xue, Jiangsu (CN)

(72) Inventor: Junhua Xue, Jiangsu (CN)

( * ) Notice: Subject to any disclaimer, the term of this patent is extended or adjusted under 35 U.S.C. 154(b) by 500 days.

(21) Appl. No.: 14/890,120

(22) PCT Filed: Sep. 2, 2015

(86) PCT No.: PCT/CN2015/088812
§ 371 (c)(1),
(2) Date: Nov. 9, 2015

(87) PCT Pub. No.: WO2017/035800
PCT Pub. Date: Mar. 9, 2017

(65) Prior Publication Data
US 2017/0254650 A1    Sep. 7, 2017

(51) Int. Cl.
*G01C 21/00* (2006.01)
*G01C 21/32* (2006.01)
*G01C 21/36* (2006.01)
*G01S 19/42* (2010.01)
*G06F 17/30* (2006.01)

(52) U.S. Cl.
CPC .......... *G01C 21/32* (2013.01); *G01C 21/362* (2013.01); *G01C 21/3641* (2013.01); *G01C 21/3644* (2013.01); *G01S 19/42* (2013.01); *G06F 17/3087* (2013.01); *G06F 17/30241* (2013.01)

(58) Field of Classification Search
None
See application file for complete search history.

*Primary Examiner* — Bhavesh V Amin

(57) ABSTRACT

An interactive dynamic cloud navigation system includes: a server, including a database, wherein the database stores a map, a management account and a plurality of accounts; a plurality of navigation terminal and a plurality of users; and a map operator which logs in the management account on the server to manage the database. The navigation terminal includes a data collection module, a data storage module, a data transmission module, and an input and output module, wherein: the data collection module is for collecting data; the data transmission module is for transmitting the data between the navigation terminal and the server; and the input and output module is for receiving an input of the user and outputting the data stored in the navigation terminal to the user. The server records a geographic position of each user and a time, and stores the geographic position and the time into the database.

20 Claims, 9 Drawing Sheets

INTERACTIVE DYNAMIC CLOUD NAVIGATION SYSTEM

CROSS REFERENCE OF RELATED APPLICATION

This is a U.S. National Stage under 35 U.S.C 371 of the International Application PCT/CN2015/088812, filed Sep. 2, 2015.

BACKGROUND OF THE PRESENT INVENTION

Field of Invention

The present invention relates to a cloud navigation system, and more particularly to an interactive dynamic cloud navigation system.

Description of Related Arts

Generally, the users are relatively familiar with and know about the surrounding environment which the users frequently visit. The known information lacks scarcity for the users, but may be urgently needed by other users. Therefore, it is necessary to fully take advantage of daily visit tracks of the users and share the known information about the surrounding environment of the users with the other users who need the known information.

The inventor of the present invention previously disclosed the interactive dynamic cloud navigation system in the US patent application US 20140350841 (Chinese patent application CN 201310200531.0), which has the following disadvantages.

Firstly, the previously disclosed system provides few channels for the users to interact with each other. The previously disclosed system merely provides the four types of mission affiliates as the channels for the interaction of the users, respectively as: (1) the users who acknowledge familiarity with the mission spots by marking out the familiar mission spots when registering the accounts thereof via the server, wherein the mission spots are geographic positions correspondent to the mission initiated by the server; (2) the users who have appeared within a certain range around the mission spots over the predefined frequency according to the analysis of GPS signals by the server; (3) the users who are currently appearing at the mission spots according to the analysis of GPS signals by the server; and (4) the users whose accounts have accomplished the certain number of missions and the users who accomplish the missions at the certain frequency. The four types of the mission affiliates are unable to fully reflect the familiarity with the spot or the region of the users. For example, a user drives by the Block 7 to work every day; although the user frequently appears at the Block 7, the user may not know some detailed data about the Block 7 as well as the residents who live in the Block 7 for a long time. Therefore, the users who have appeared within the certain range around the mission spots over the predefined frequency do not certainly belong to the high-quality mission affiliates; it is necessary to introduce additional features into the different types of the mission affiliates, such as the residence time. Moreover, the US patent application merely disclosed that the users mark out the familiar mission spots when registering the accounts thereof via the server; the users are unable to mark after the users gradually become familiar with more mission spots. The types of the mission affiliates remain to be extended and optimized.

Secondly, the previously disclosed system randomly sends the mission to the mission affiliates, wherein each mission affiliate is sent with the mission by the equal probability without distinguishing the quality of the mission affiliates. For example, the data provided by the mission affiliate A who is 10 m distant from the mission spot, is more reliable and closer to reality than the data provided by the mission affiliate B who is 100 m distant from the mission spot. In other words, for the mission at the mission spot, the mission affiliate A has higher quality than the mission affiliate B. Therefore, when the mission is being sent, the mission affiliate A is supposed to be prior to the mission affiliate B.

Thirdly, the previously disclosed system is silent about the situation where the single user belongs to at least two types of the mission affiliates. Besides, the four different types of the mission affiliates are independent from each other; the user is unable to generate different combinations from the four types of the mission affiliates and to define new mission affiliate combination for the mission.

Therefore, it is necessary to improve the previously disclosed system and solve the above three problems.

SUMMARY OF THE PRESENT INVENTION

An object of the present invention is to provide an interactive dynamic cloud navigation system which divides users into seven types of mission affiliates, thereby facilitating interaction among the users.

Another object of the present invention is to provide the interactive dynamic cloud navigation system which executes a weighted calculation upon the users who simultaneously belong to different types of mission affiliates and then ranks the users according to scores of the weighted calculation, so as to guarantee a priority of the users with higher scores to get a mission over the users with lower scores, which improves reliability and correctness of map data.

Another object of the present invention is to introduce four logic calculations into the interactive dynamic cloud navigation system, comprising AND, OR, NOT and XOR, through which the user who requests for data optimizes and combines the seven types of the mission affiliates, so as to satisfy customized needs of each individual user.

Yet another object of the present invention is to introduce private ownership of the map data into the interactive dynamic cloud navigation system.

Accordingly, in order to accomplish the above objects, the present invention provides an interactive dynamic cloud navigation system, comprising:

a server, comprising a database, wherein the database stores a map, a management account and a plurality of accounts;

a plurality of navigation terminals and a plurality of users corresponding to the plurality of the navigation terminals, wherein: each user logs in the corresponding account on the server through the corresponding navigation terminal, for initiating a mission which corresponds to a region of the map; each navigation terminal comprises a data collection module, a first data storage module, a first data transmission module, and a first input and output module; the data collection module, for collecting data, comprises a Global Position System (GPS) chip; the first data transmission module is for transmitting the data between the navigation terminal and the server; the first data storage module is for storing the data; the first input and output module is for receiving an input of the user and for outputting to the user the data stored in the navigation terminal; through the data collection module, the first data storage module and the first data transmission module, the server records in real-time a geographic position of each user corresponding to the navigation terminal and a time, and stores the geographic position and the time in the database; and a map operator which logs in the management account on the server for managing the database.

The interactive dynamic cloud navigation system further comprises: a plurality of assistant terminals respectively corresponding to the plurality of the users, wherein: each user logs in the corresponding account on the server through the corresponding assistant terminal, for initiating the mission; each assistant terminal comprises a second data storage module, a second data transmission module, and a second input and output module; the second data transmission module is for transmitting the data between the assistant terminal and the server; the second data storage module is for storing the data; the second input and output terminal is for receiving the input of the user and outputting to the user the data stored in the assistant terminal.

In the interactive dynamic cloud navigation system, the user uploads the mission to the server through the first data transmission module or the second data transmission module; the server receives the mission, and then calculates and screens out mission affiliates corresponding to the mission according to the region to which the mission corresponds; the server selects out mission receivers from the mission affiliates corresponding to the mission, and sends the mission to the mission receivers; then, the mission receivers respectively log in the navigation terminals or the assistance terminals thereof to receive and execute the mission, generate feedback data of the mission, and upload the feedback data to the server; the server receives the feedback data, and sends the feedback data to the user who initiates the mission; after the user who initiates the mission confirms a finish of the mission, the server stores the mission and the feedback data of the mission into the database.

Preferably, the server randomly selects out the mission receivers from the mission affiliates corresponding to the mission.

Preferably, the server executes a weighted calculation upon the mission affiliates corresponding to the mission and then ranks the mission affiliates corresponding to the mission according to scores of the weighted calculation to obtain a ranking list; the server selects out the mission receivers from the ranking list.

Preferably, after the user who initiates the mission confirms the finish of the mission, the server allocates credits between the account of the user who initiates the mission and the accounts of the mission receivers.

The mission affiliates comprise at least one of the following seven types of users:

(1) the user who actively acknowledges familiarity with a mission region by marking out a familiar region on the map when logging in the account thereof on the server through the corresponding navigation terminal or assistant terminal, wherein: the mission region is the region of the map to which the mission corresponds, and the familiar region of the user comprises the mission region;

(2) the user who accumulatively appears in the mission region more than certain times, wherein the certain times is a threshold value of the type (2);

(3) within a period of time, the user who accumulatively stays in the mission region longer than a duration, wherein the duration is the threshold value of the type (3);

(4) the user who appears in the mission region at a timing, wherein a time lag between a timing when the mission is initiated and the timing when the user appears in the mission region is less than a value; the value is the threshold value of the type (4);

(5) the user whose geographic position is within a certain distance from a center of the mission region, wherein the certain distance is the threshold value of the type (5);

(6) the user who appears in the mission region at a speed slower than a certain speed, wherein the certain speed is the threshold value of the type (6); and (7) the user who is empowered by the map operator to be a mission affiliate corresponding to a certain region of the map, wherein the certain region of the map comprises the mission region.

Preferably, when the user initiates the mission, the user selects the mission region to generate coordinates; from the seven types of the mission affiliates, selects the types to which the mission is related, and sets the threshold values of the types; from four logic calculation symbols, selects out a logic calculation relationship for the several types, wherein the four logic calculation symbols are AND, OR, NOT and XOR; sets an effective period of the mission; inputs and edits a paragraph of texts or an audio, to generate a main content of the mission; sets rewarding credits of the mission; and introduces an agree option and a disagree option.

The mission comprises: the effective period, within which the mission receivers are able to execute the mission and upload the feedback data, and beyond which the mission is set by the server to expire, which means the mission can not be executed; mission affiliate data, which comprises: the coordinates of the mission region, the types to which the mission is related and the logic calculation relationship for the several types; the agree option, provided to the mission receivers to choose, for representing a personal will of the mission receiver that the mission receiver agrees that the server further stores the mission into the map after the finish of the mission; the disagree option, provided to the mission receivers to choose, for representing a personal will of the mission receiver that the mission receiver disagrees that the server stores the mission into the map after the finish of the mission; the main content of the mission which is an illustration about the mission provided by the user who initiates the mission; and, the rewarding credits which are provided by the user who initiates the mission as a reward to the mission receivers.

Further preferably, after the server receives the mission, the server obtains the mission region, the types to which the mission is related and the logic calculation relationship for the several types. When the mission is related to only one type, the server analyzes GPS tracks of all the users based on the database, and calculates out the one type of the mission affiliates corresponding to the mission, so as to obtain the mission affiliates corresponding to the mission. When the mission is related to more than one types, the server analyzes GPS tracks of all the users based on the database, and respectively calculates out each type of the mission affiliates corresponding to the mission; then, according to the logic calculation relationship, the server executes a logic calculation upon the more than one types of the mission affiliates, so as to obtain the mission affiliates corresponding to the mission.

Preferably, after the server sends the mission to the mission receivers and before the server receives confirmation data and sets the mission to expire, the navigation terminal or the assistant terminal is further for logging on the server by other users and initiating a data search on the server to search out the mission. The server sends to the other users, the mission which is searched out and two options of sharing credits and adding credits, as two manners for joining the mission, corresponding to the mission. After the other users choose the mission and the manner for joining the mission provided by the navigation terminal or the assistant terminal, the other users generate application data and upload the application data to the server. After the user who initiates the mission uploads the confirmation data to the server and before the server sets the mission to expire, the server sends the feedback data to the other users. According to the manner for joining the mission chosen by the other users, the server allocate the credits among the accounts corresponding to the other users, the account of the user who initiates the mission and the accounts of the mission receivers.

The two manners for joining the mission are: (1) sharing the credits: the other users and the user who initiates the mission share the rewarding credits; the rewarding credits stay unchanged with the other users join the mission; and (2) adding the credits: the other users bring additional credits while joining the mission, based on the rewarding credits provided by the user who initiates the mission; the rewarding credits increase with the other users join the mission.

These and other objectives, features, and advantages of the present invention will become apparent from the following detailed description, the accompanying drawings, and the appended claims.

DETAILED DESCRIPTION OF THE PREFERRED EMBODIMENT

Figure 1:
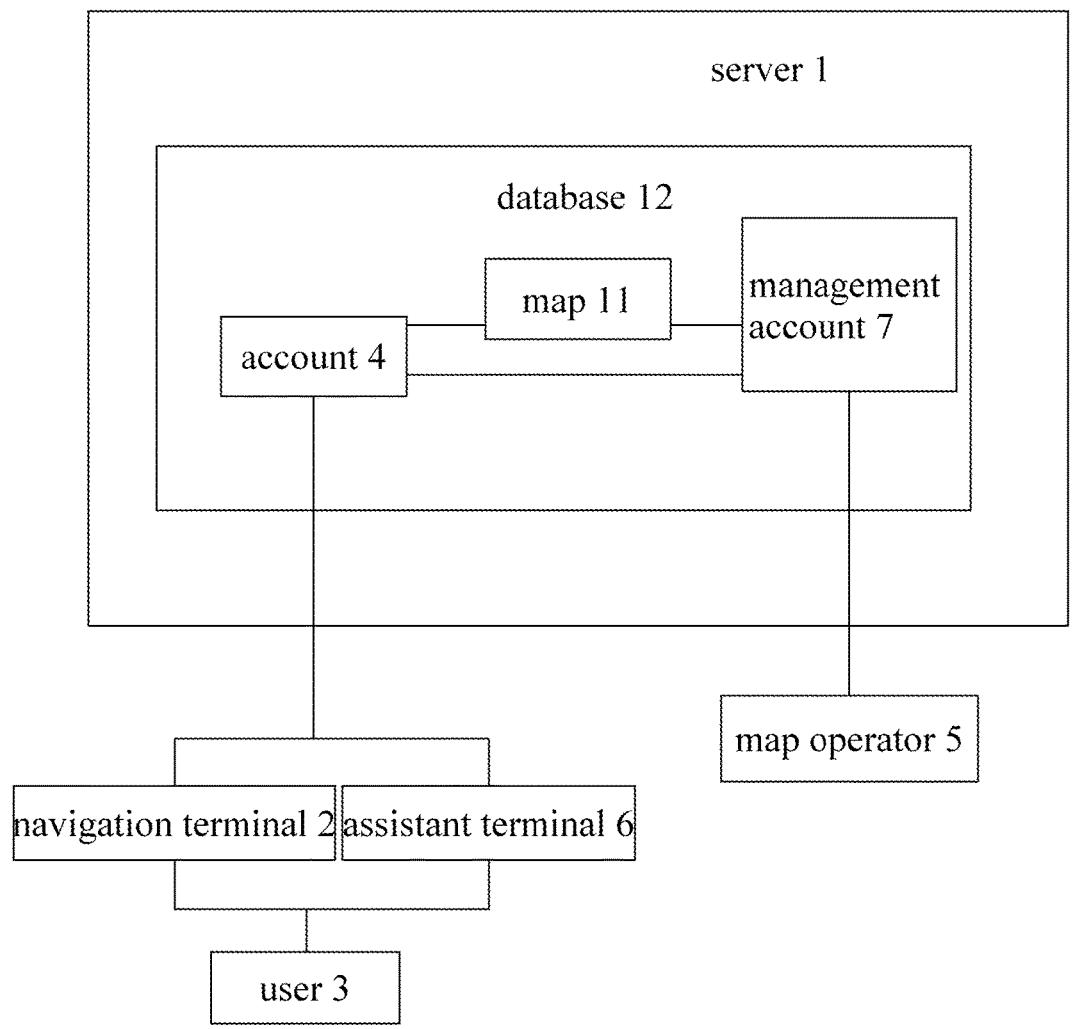
FIG. 1 is a block diagram of an interactive dynamic cloud navigation system according to a first preferred embodiment of the present invention.
Figure 2:
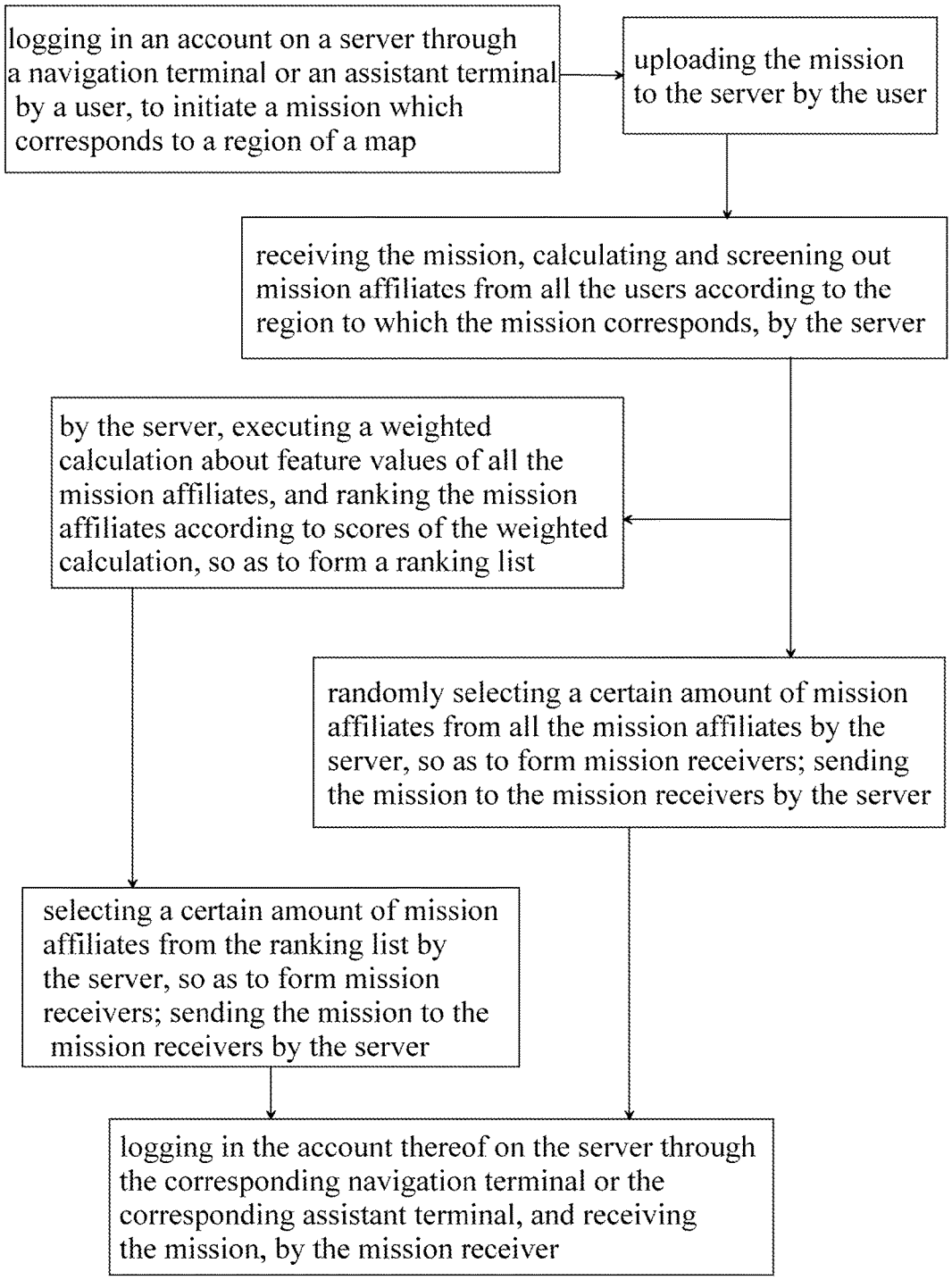
FIG. 2 is a flow chart of receiving a mission by mission receivers according to the first preferred embodiment of the present invention.
Figure 3:
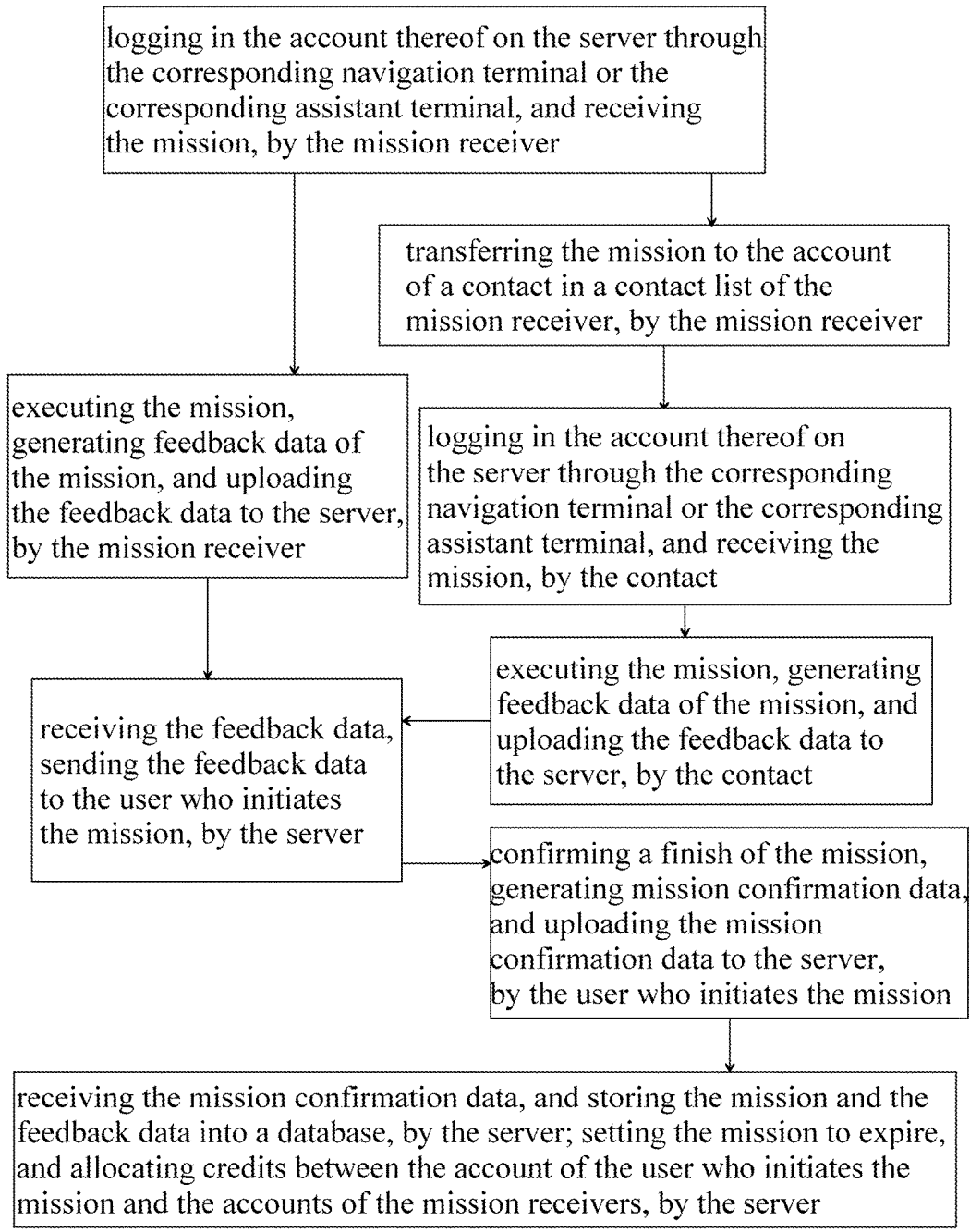
FIG. 3 is a flow chart of executing the mission or transferring the mission by the mission receiver according to the first preferred embodiment of the present invention.

Referring to FIGS. 1-3 of the drawings, according to a first preferred embodiment of the present invention, an interactive dynamic cloud navigation system comprises:

a server 1, comprising a database 12, wherein the database 12 stores a map 11, a management account 7 and a plurality of accounts 4;

each user 3 corresponding to each of the plurality of the account 4, each navigation terminal 2 and each assistant terminal 6 corresponding to the user 3, wherein: the user 3 logs in the account 4 thereof on the server 1 through the corresponding navigation terminal 2 or the corresponding assistant terminal 6, for initiating a mission which corresponds to a region of the map 11; and a map operator 5, logging in the management account 7 on the server 1 for managing the database 12.

Figure 4:
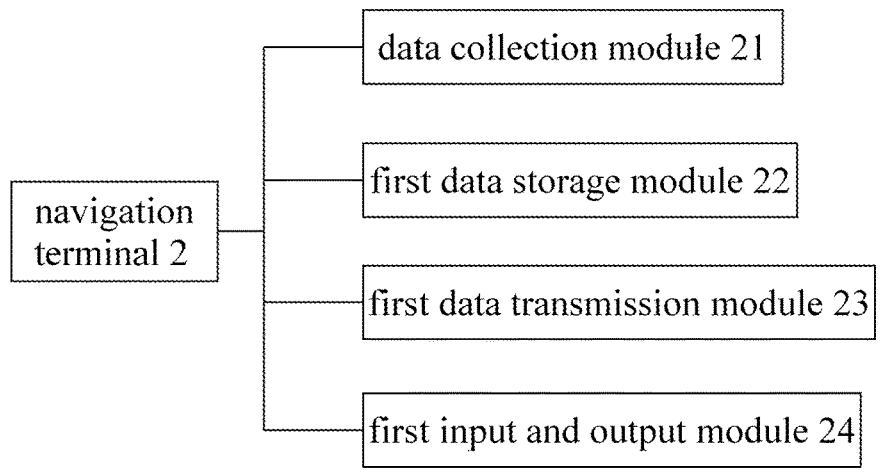
FIG. 4 is a sketch view of a navigation terminal according to the first preferred embodiment of the present invention.

As shown in FIG. 4, each the navigation terminal 2 comprises a data collection module 21, a first data storage module 22, a first data transmission module 23, and a first input and output module 24. The data collection module 21, for collecting data, comprises a GPS chip/Location Based Services (LBS) chip, an electronic level meter and an electronic humidity/temperature meter. The first data storage module 22 is a memory, for storing the data. The first data transmission module 23, for transmitting the data between the navigation terminal and the server, is a WIFI chip, a Bluetooth chip, a WCDMA/LTE chip or an Ethernet chip. The first input and output module 24, for receiving an input of the user and outputting the data stored in the navigation terminal to the user, comprises an audio input and output chip, a video input and output chip, and a text input and output chip. Based on the data collection module 21, the first data storage module 22 and the first data transmission module 23, the server 1 records a geographic position of each user 3 corresponding to the navigation terminal 2 and a time in real time, and stores the geographic position and the time in the database 12. Positioning data of the system is not limited to GPS data, and can also be LBS positioning data, WiFi AP positioning data, or Bluetooth positioning data (iBeacon).

Figure 5:
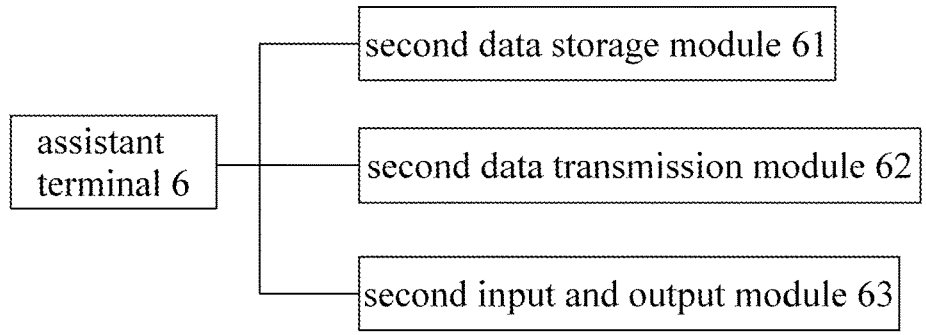
FIG. 5 is a sketch view of an assistant terminal according to the first preferred embodiment of the present invention.

As shown in FIG. 5, each the assistant terminal 6 comprises a second data storage module 61, a second data transmission module 62, and a second input and output module 63. The second data storage module 61, for storing the data, is also a memory. The second data transmission module 62, for transmitting the data between the assistant terminal 6 and the server 1, can be a WiFi chip, a Bluetooth chip, a WCDMA/LTE chip, or an Ethernet chip. The second input and output module 63, for receiving the input of the user and outputting the data stored in the assistant terminal to the user, comprises an audio input and output chip, a video input and output chip, and a text input and output chip.

Table 1 shows a comparison between the navigation terminal 2 and the assistant terminal 6.

TABLE 1

Comparison of functions of navigation terminal and assistant terminal

| | download data from server/upload data to server | upload GPS signal to server | output data to user/receive input of user |
|---|---|---|---|
| Navigation terminal | yes | yes | yes |
| Assistant terminal | yes | no | yes |

Figure 6:
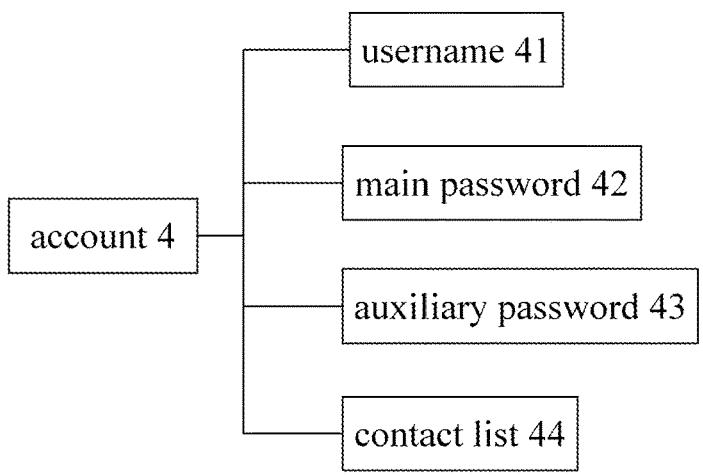
FIG. 6 is a sketch view of an account according to the first preferred embodiment of the present invention.

As shown in FIG. 6, each account 4 comprises a username 41, a main password 42, an auxiliary password 43 and a contact list 44. The username 41 is a unique identification code required for uploading or downloading the data by the user 3 who logs on the server 1 through the corresponding navigation terminal 2 or the corresponding assistant terminal 6. The username 41 is given by the server 1 to the user 3 when the user 3 registers. The main password 41 is a first key which the user needs to input when the user 3 logs on the server 1 through the corresponding navigation terminal 2 or the corresponding assistant terminal 6. When the user 3 inputs the username 41 and the main password 42 through the corresponding navigation terminal 2 or the corresponding assistant terminal 6 to log in the account 4 on the server 1, the user 3 is entitled to edit, manage and browse real information of the account, and to initiate or receive the mission through the account 4. The auxiliary password 43 is a second key which the user needs to input when the user 3 logs on the server 1 through the corresponding navigation terminal 2 or the corresponding assistant terminal 6. When the user 3 inputs the username 41 and the auxiliary password 43 through the corresponding navigation terminal 2 or the corresponding assistant terminal 6 to log in the account 4 on the server 1, the user 3 is entitled to edit, manage and browse fake information of the account, and to initiate or receive the mission through the account 4. The contact list 44 is a storage space in the account 4 of the user 3 where usernames 41 of contacts of the user 3 are stored. The contacts are the other users 3 who agree to establish connection via a bilateral confirmation.

Figure 7:
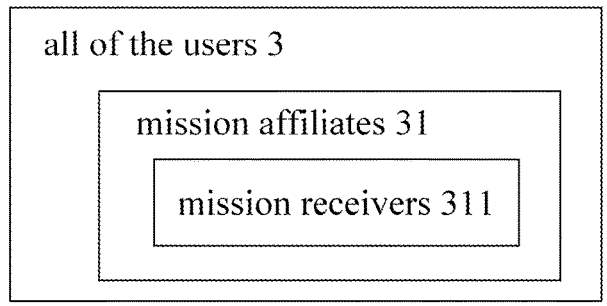
FIG. 7 is a sketch view of all users according to the first preferred embodiment of the present invention.
Figure 8:
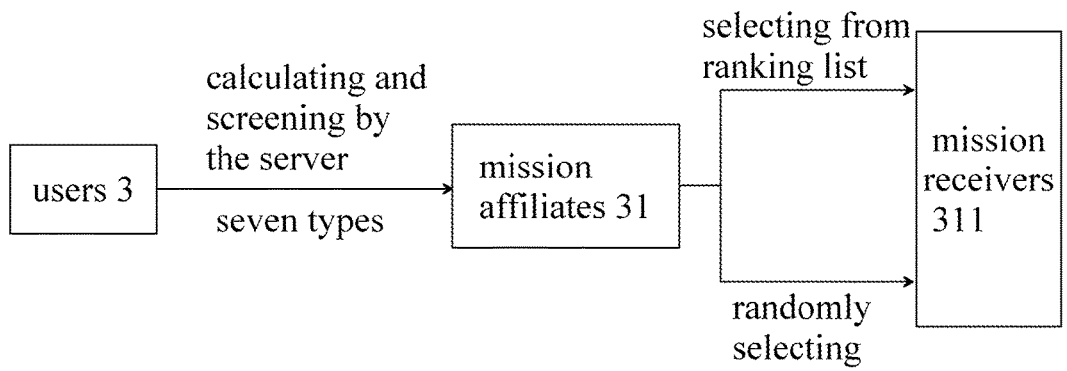
FIG. 8 is a sketch view of the mission receivers according to the first preferred embodiment of the present invention.

As shown in FIGS. 2, 7 and 8, in the interactive dynamic cloud navigation system, the user who initiates the mission uploads the mission to the server 1 through the first data transmission module 23 or the second data transmission module 62; the server 1 receives the mission, and then, calculates and screens out mission affiliates 31 corresponding to the mission from all of the users 3 according to the region of the map to which the mission corresponds (mission region, for short).

The server 1 randomly selects a certain amount of the mission affiliates from the mission affiliates 31 corresponding to the mission, so as to form mission receivers 311; and then, the server 1 sends the mission to the mission receivers 311.

Or, the server 1 executes a weighted calculation upon the mission affiliates 31 corresponding to the mission and ranks the mission affiliates 31 according to scores of the weighted calculation, so as to form a ranking list; the server 1 selects out a certain amount of the mission affiliates from the ranking list, so as to form mission receivers 311; and then, the server 1 sends the mission to the mission receivers 311. The mission receivers 311 log in the accounts 4 thereof on the server 1 through the corresponding navigation terminals 2 or the corresponding assistant terminals 6 to receive the mission.

The randomly selecting is mainly an uncertain selection manner, but is unable to represent a quality of different users. In other words, a good user who has high honesty and frequently interacts with the server has the same and equal opportunity to be chosen as the mission receiver with an ordinary user who has low honesty and occasionally interacts with the server, without distinguishing the different quality of the different users, which impairs a quality of an execution of the mission to some extent.

Nevertheless, the randomly selecting is advantageous in that, when the user initiates the mission, the user is unable to determine which mission affiliate to select. Especially when the mission is related to the data of the map, storing and updating the data should be strict; by randomly selecting, it is avoided that some user intentionally wins high scores in the ranking list and ranks relatively high so that the user can get the mission and upload fake data or illegal data.

Selecting out the mission receives by the ranking list has the advantages and disadvantages exactly opposite to the randomly selecting. When the mission is related to the data with high strictness, the randomly selecting is preferred. On the contrary, when the mission is related to the data with low strictness, selecting out the mission receivers by the ranking list is preferred.

The certain amount of the mission affiliates are selected out to be the mission receivers, wherein the certain amount is set by the server 1 based on the mission. The certain amount of the mission affiliates is directly proportional to an importance of the data of the mission, as illustrated in US patent application US 20140350841 (corresponding Chinese patent application CN 201310200531.0). For example, the server divides the data of the mission into several levels of importance: for the mission that the user personally needs the feedback data, the certain amount is 20; for the mission of editing general information spots of the map, the certain amount is 20; for the mission of editing the data of the road branches of the map, the certain amount is 40; and for the mission of editing information of important landmarks or major roads, the certain amount is 60. In brief, the more important information, the more users to interact.

In order to protect the users of the interactive dynamic cloud navigation system from being disturbed by lots of missions, the interactive dynamic cloud navigation system selects out the certain amount of the mission affiliates to be the mission receivers, instead of widely sending the mission to all of the mission affiliates.

As shown in FIG. 3, after the mission receiver 311 receives the mission, the mission receiver 311 executes the mission, generates feedback data of the mission, and uploads the feedback data to the server 1, so as to accomplish the mission.

Or, the mission receiver 311 transfers the mission to the account 4 of the contact in the contact list 44 of the mission receiver 311; the contact logs in the account 4 thereof on the server 1 through the navigation terminal 2 or the assistant terminal 6 thereof to receive the mission; then, the contact executes the mission, generates the feedback data of the mission, and uploads the feedback data to the server 1, so as to accomplish the mission.

The server 1 receives the feedback data, and sends the feedback data to the user 3 who initiates the mission; the user 3 who initiates the mission confirms a finish of the mission, generates a mission confirmation data, and uploads the mission confirmation data to the server 1. The server 1 receives the mission confirmation data, and stores the mission and the feedback data in the database 12. The server 1 sets the mission to expire, and meanwhile, the server 1 allocates rewarding credits between the user 3 who initiates the mission and the mission receivers 311.

It is worth to mention that, after the mission receiver 311 transfers the mission to the contact in the contact list, the mission receiver 311 is no longer entitled to enjoy the rewarding credits. When the server 1 allocates the credits after the finish of the mission, the server 1 gives the credits, originally corresponding to the mission receiver, to the account of the contact in the contact list.

The mission affiliates comprise at least one of the following seven types of users:

(1) the user 3 who actively acknowledges familiarity with the mission region by marking out a familiar region on the map 11 when logging in the account 4 thereof on the server 1 through the corresponding navigation terminal 2 or assistant terminal 6, wherein the familiar region of the user comprises the mission region;

(2) the user 3 who accumulatively appears in the mission region more than certain times, wherein the certain times is a threshold value of the type (2);

(3) within a period of time, the user 3 who accumulatively stays in the mission region longer than a duration, wherein the duration is the threshold value of the type (3);

(4) the user 3 who appears in the mission region at a timing, wherein a time lag between a timing when the mission is initiated and the timing when the user appears in the mission region is less than a value; the value is the threshold value of the type (4);

(5) the user 3 whose geographic position is within a certain distance from a center of the mission region, wherein the certain distance is the threshold value of the type (5);

(6) the user 3 who appears in the mission region at a speed slower than a certain speed, wherein the certain speed is the threshold value of the type (6); and (7) the user 3 who is empowered by the map operator 5 to be a mission affiliate 31 corresponding to a certain region of the map 11, wherein the certain region of the map 11 comprises the mission region.

For the type (1), the user 3 marks out the familiar regions after logging on the server 1 through the navigation terminal 2 or the assistant terminal 6, so as to generate marking data which are further uploaded to the server 1. The server 1 receives the marking data and stores the familiar regions which are marked out by the user 3 as the regions within the familiarity of the user 3.

For the type (7), the map operator 5 divides the map 11 into different regions according to geographic positions, and designates at least one user 3 to be the mission affiliate 31 for each region, which comprises steps of:

(a) logging in the account of the user on the server through the navigation terminal or the assistant terminal by the user; (b) selecting out the familiar region, applying to become the mission affiliate of the familiar region which is selected, and uploading the application to the server, by the user; (c) receiving the application and transferring the application to the management account, by the server; (d) logging in the management account on the server and receiving the application, by the map operator; and (e), agreeing with the application by the map operator, so as to empower the user to be the mission affiliate of the region.

Firstly, the map operator empowers the user to be the mission affiliate of the region; the empowered user is still a user in nature and thus still entitled to own the rewarding credits and private data after finishing the mission, the same as the other users. Secondly, the user empowered by the map operator is untitled to manage the data of the region, except the private data thereof.

According to the first preferred embodiment of the present invention, in the interactive dynamic cloud navigation system, the user 3 initiates the mission, which comprises steps of:

(1) selecting the mission region to generate coordinates; (2) from the seven types of the mission affiliates, selecting the types to which the mission is related, and setting the threshold values of the types; (3) from four logic calculation symbols, selecting out a logic calculation relationship for the several types, wherein the four logic calculation symbols are AND, OR, NOT and XOR; (4) setting an effective period of the mission; (5) inputting and editing a paragraph of texts or an audio to generate a main content of the mission; (6) setting the rewarding credits of the mission; and (7) introducing an agree option and a disagree option.

Figure 9:
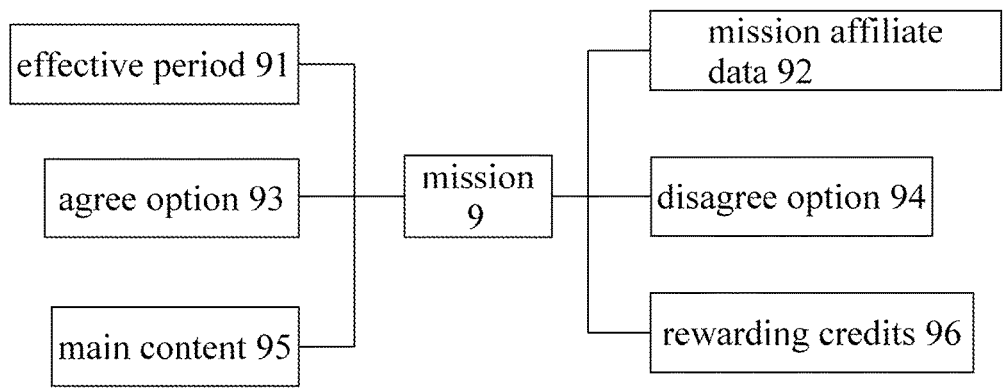
FIG. 9 is a sketch view of a data structure of the mission according to the first preferred embodiment of the present invention.

Accordingly, as shown in FIG. 9, the mission 9 comprises:

the effective period 91, within which the mission receivers 311 are able to execute the mission 9 and upload the feedback data, and beyond which the mission 9 is set by the server 1 to expire, namely that the mission 9 can not be executed;

mission affiliate data 92, which comprises: the coordinates of the mission region, the types of the mission affiliates 31 to which the mission 9 is related and the logic calculation relationship for the several types;

the agree option 93, provided to the mission receivers 311 to choose, for representing a personal will of the mission receiver 311 that the mission receiver 311 agrees that the server 1 further stores the mission 9 into the map 11 after the finish of the mission 9;

the disagree option 94, provided to the mission receivers 311 to choose, for representing a personal will of the mission receiver 311 that the mission receiver 311 disagrees that the server 1 stores the mission into the map 11 after the finish of the mission 9;

the main content 95 of the mission which is an illustration about the mission 9 provided by the user 3 who initiates the mission; and the rewarding credits 96 which are provided by the user 3 who initiates the mission as a reward to the mission receivers 311.

Figure 10:
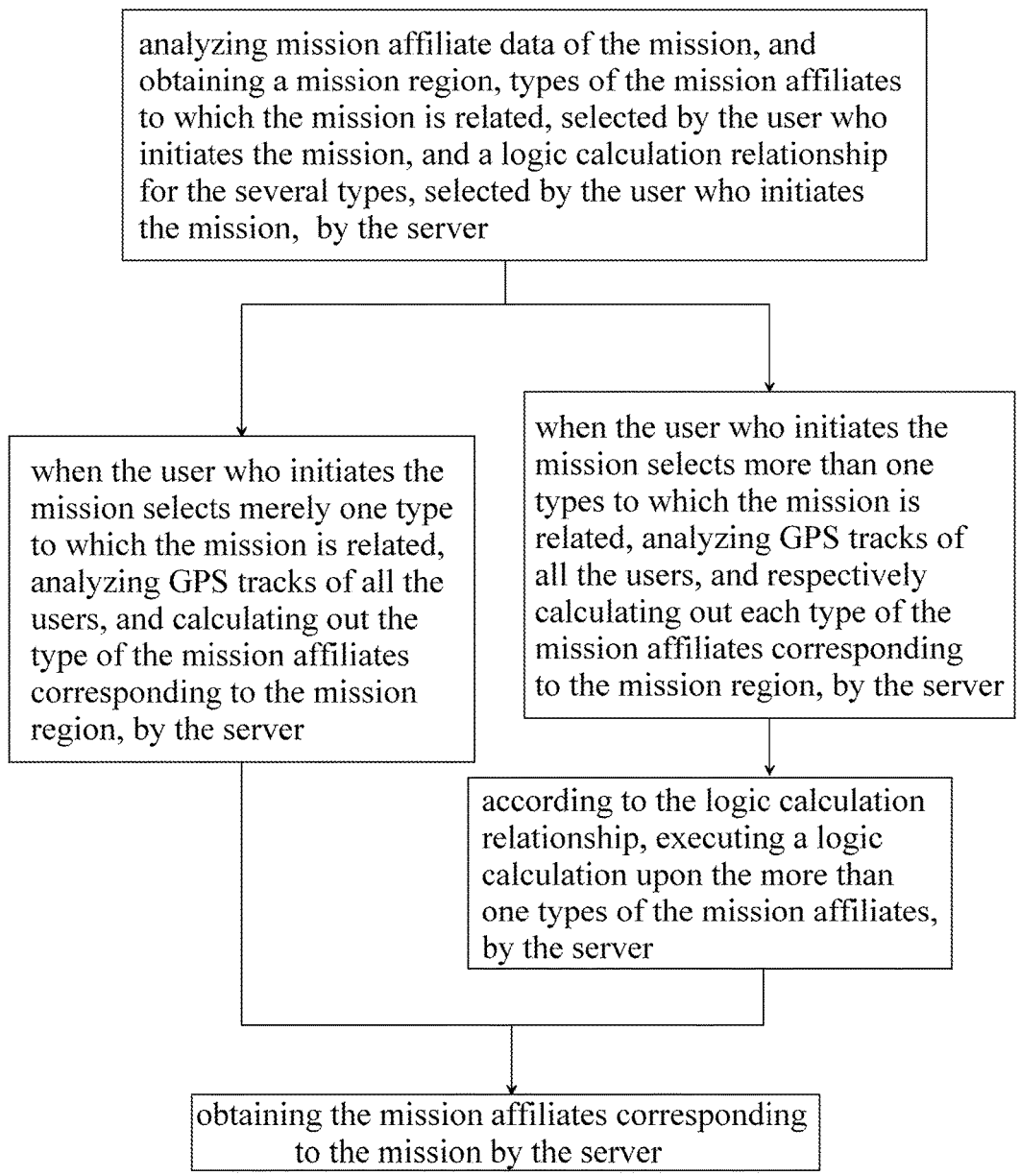
FIG. 10 is a flow chart of calculating and screening out mission affiliates corresponding to the mission from all the users by the server according to the first preferred embodiment of the present invention.

As shown in FIG. 10, according to the first preferred embodiment of the present invention, after the server 1 receives the mission 9, the server 1 analyzes the mission affiliate data 92 of the mission 9, so as to obtain the mission region, the types of the mission affiliates to which the mission 9 is related and the logic calculation relationship for the several types. When the user 3 who initiates the mission 9 selects merely one type to which the mission 9 is related, the server 1 analyzes GPS tracks of all the users 3, and calculates out the type of the mission affiliates corresponding to the mission region, so as to obtain the mission affiliates 31 corresponding to the mission 9. When the user 3 who initiates the mission 9 selects more than one types to which the mission is related, the server 1 analyzes GPS tracks of all the users 3, and respectively calculates out each type of the mission affiliates corresponding to the mission region; then, according to the logic calculation relationship, the server 1 executes a logic calculation upon the more than one types of the mission affiliates, so as to obtain the mission affiliates 31 corresponding to the mission 9.

Further, if a number of the mission affiliates 31 corresponding to the mission 9 which are obtained by the server 1 after calculating and selecting, the server 1 enlarges the mission region proportionally, and thereafter, calculates and selects out the mission affiliates again, until the number of the mission affiliates 31 corresponding to the mission 9 which are obtained by the server 1 is no longer zero.

Figure 11:
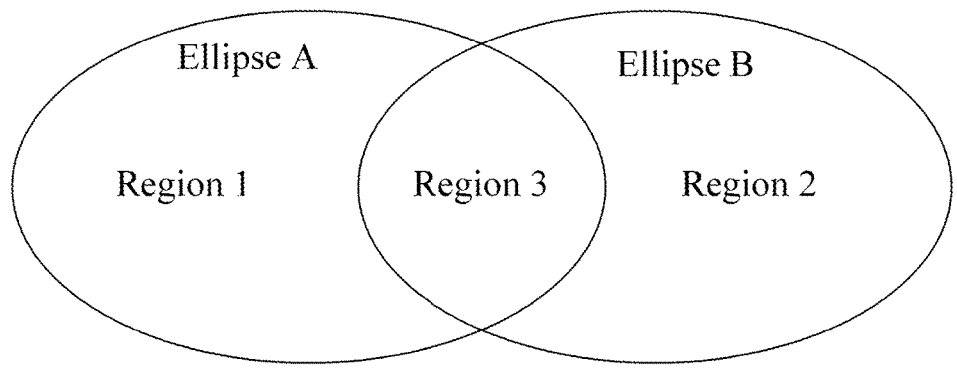
FIG. 11 is a sketch view of a logic calculation by the server according to a second preferred embodiment of the present invention.

In order to explain and illustrate the logic calculation and the weighted calculation thereafter by the server, according to a second preferred embodiment of the present invention, as shown in FIG. 11, when the user 3 initiates the mission 9, the user 3 selects the type (2) and the type (3) to which the mission is related from the seven types of the mission affiliates, and respectively setting the threshold values of the type (2) and the type (3); the user 3 selects the OR as the logic calculation relationship between the type (2) and the type (3). Afterwards, the server 1 analyzes the GPS tracks of all the users 3, and respectively calculates out the type (2) and the type (3) of the mission affiliates corresponding to the mission region.

As shown in FIG. 11, an ellipse A represents the users of the type (2), and an ellipse B represents the users of the type (3). A region 1 represents the users merely belonging to the type (2); a region 2 represents the users merely belonging to the type (3); and a region 3 represents the users belonging to both the type (2) and the type (3).

The four logic calculation symbols respectively have meanings as follows.

(1) AND

A AND B is equal to B AND A, which represents the users belonging to both the type (2) and the type (3), corresponding to the region 3;

(2) OR

A OR B is equal to B OR A, which represents the users belonging to the type (2) or the type (3), corresponding to the region 1, the region 2 and the region 3;

(3) NOT

A NOT B represents the users who belong to the type (2) but not the type (3), corresponding to the region 1; B NOT A represents the users who belong to the type (3) but not the type (2); and (4) XOR A XOR B is equal to B XOR A, which represents the users who belong to merely one of the type (2) and the type (3), corresponding to the region 1 and the region 2.

In the weighted calculation upon each type of the mission affiliates by the server, the score of each type is obtained by multiplying a feature value with a weighted coefficient, as shown in Table 2.

TABLE 2 weighted calculation upon seven types of mission affiliates by server for scores in ranking list

| type | feature value | Relationship between feature value and score | Weighted coefficient | Score in ranking list |
|---|---|---|---|---|
| (1) | a | Yes/No | A | A*a |
| (2) | b | Direct proportion | B | B*b |
| (3) | c | Direct proportion | C | C*c |
| (4) | d | Inverse proportion | D | D*d |
| (5) | e | Inverse proportion | E | E*e |
| (6) | f | Inverse proportion | F | F*f |
| (7) | g | Yes/No | G | G*g |

The weighted coefficients A, B, C and G are positive numbers, while D, E and F are negative numbers.

For the type (1), a is the feature value of the user, wherein a is a constant. For the type (2), b is the times by which the user accumulatively appears in the mission region. For the type (3), c is the duration for which the user accumulatively stays in the mission region within the period of time. For the type (4), d is the time lag between the timing when the mission is initiated and the timing when the user appears in the mission region. For the type (5), e is the distance between the geographic position of the user and the center of the mission region. For the type (6), f is the speed at which the user appears in the mission region. For the type (7), g is the feature value of the user, wherein g is a constant.

The score of the user who merely belongs to one type is the score of the user under the one type.

The score of the user who simultaneously belongs to at least two types is a sum of the scores of the user under each type.

For example, if the user simultaneously belongs to the seven types, the score of the user in the ranking list is A*a+B*b+C*c+D*d+E*e+F*f+G*g. Similarly, if the user simultaneously belongs to the type (2), the type (3) and the type (4), the score of the user in the ranking list is B*b+C*c+D*d.

A shown in FIG. 11, according to the second preferred embodiment of the present invention, the server 1 executes the weighted calculation upon the mission affiliates 31 of the region 1, the region 2 and the region 3, and ranks the mission affiliates 31 of the region 1, the region 2 and the region 3 according to results of the weighted calculation (namely the scores), so as to form the ranking list.

In the ranking list, the user in the region 1 has the scores of: a product of the feature value of the user under the type (2) and the weighted coefficient of the type (2).

In the ranking list, the user in the region 2 has the scores of: a product of the feature value of the user under the type (3) and the weighted coefficient of the type (3).

In the ranking list, the user in the region 3 has the scores of: (a product of the feature value of the user under the type (2) and the weighted coefficient of the type (2))+(a product of the feature value of the user under the type (3) and the weighted coefficient of the type (3)), namely a sum of the product of the feature value of the user under the type (2) and the weighted coefficient of the type (2), and the product of the feature value of the user under the type (3) and the weighted coefficient of the type (3).

In order to further illustrate a practical application of the logic calculation and the weighted calculation thereafter, by the server, in daily life, according to a third preferred embodiment of the present invention, the user uses the logic calculation to define the mission affiliates during initiating the mission.

A user M sends out the mission and intends that the mission receivers had better be customers of a supermarket, rather than employees working in the supermarket.

According to features of the users, the GPS tracks of the customers of the supermarket are characterized in that the customers appear in the supermarket more than once; the GPS tracks of the employees working in the supermarket are characterized in that the employees accumulatively appear at the supermarket more than 20 hours in recent 4 days.

The user M initiates the mission through the following steps:

firstly, setting the supermarket to be the mission region; secondly, according to characteristics of the customers, selecting the type (2) and setting the threshold value of the type (2) to be one time, namely the users who appear at the supermarket more than once, thereby forming the users of the type (2); according to characteristics of the employees, selecting the type (3), setting the threshold value of the type (3) to be 20 hours and the period of time of the type (3) to be recent 4 days, thereby forming the users of the type (3); next, introducing the logic calculation NOT between the type (2) and type (3); then, setting the effective period and the main content of the mission; and finally, uploading the mission to the server, in such a manner that the server executes the corresponding logic calculation and screens out the mission affiliates corresponding to the mission.

Figure 12:
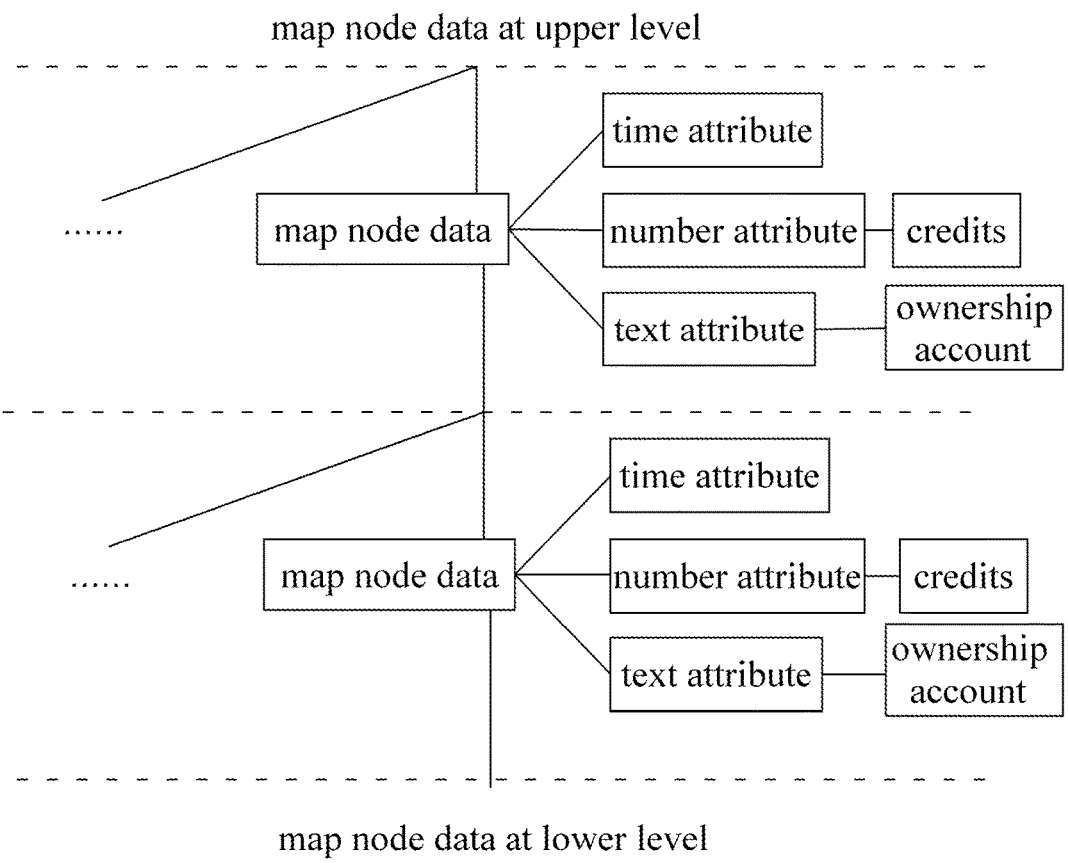
FIG. 12 is a sketch view of a data structure of a map according to a fourth preferred embodiment of the present invention.

According to a fourth preferred embodiment of the present invention, FIG. 12 shows a structure of the map 11 of the interactive dynamic cloud navigation system. Map data refer to all the data stored in the map 11, comprising map node data and appending attributes corresponding to the map node data. The map node data is a comprehensive information point with geographic position, directly used for map marking and user navigation. The map node data can be edited through initiating the mission by the user, or be edited by the user empowered by the map operator, or directly edited by the map operator who logs in the management account. The appending attributes are data for further illustrating the map node data. For example, the user adds map node data under supermarket B, street A: cola drink; adds a text attribute: Pepsi; and adds a number attribute: 1.5 US dollars. The map data has a structure of a tree topology. In the tree topology, the server divides the map node data into a plurality of levels according to geographical appending relationships and store the map node data in the map 11, wherein each map node data has the appending attributes of, but not limited to, the number attribute, the text attribute and a time attribute. As shown in FIG. 12, credits belong to the number attribute, for indicating an amount of the credits which are paid to invoke the map node data; the user logs in an ownership account corresponding to the map node data to set the credits. The ownership account belongs to the text attribute, for indicating the account getting the paid credits when the map node data are invoked; the server stores the map node data into the map 11, and meanwhile, sets the ownership account.

Figure 13:
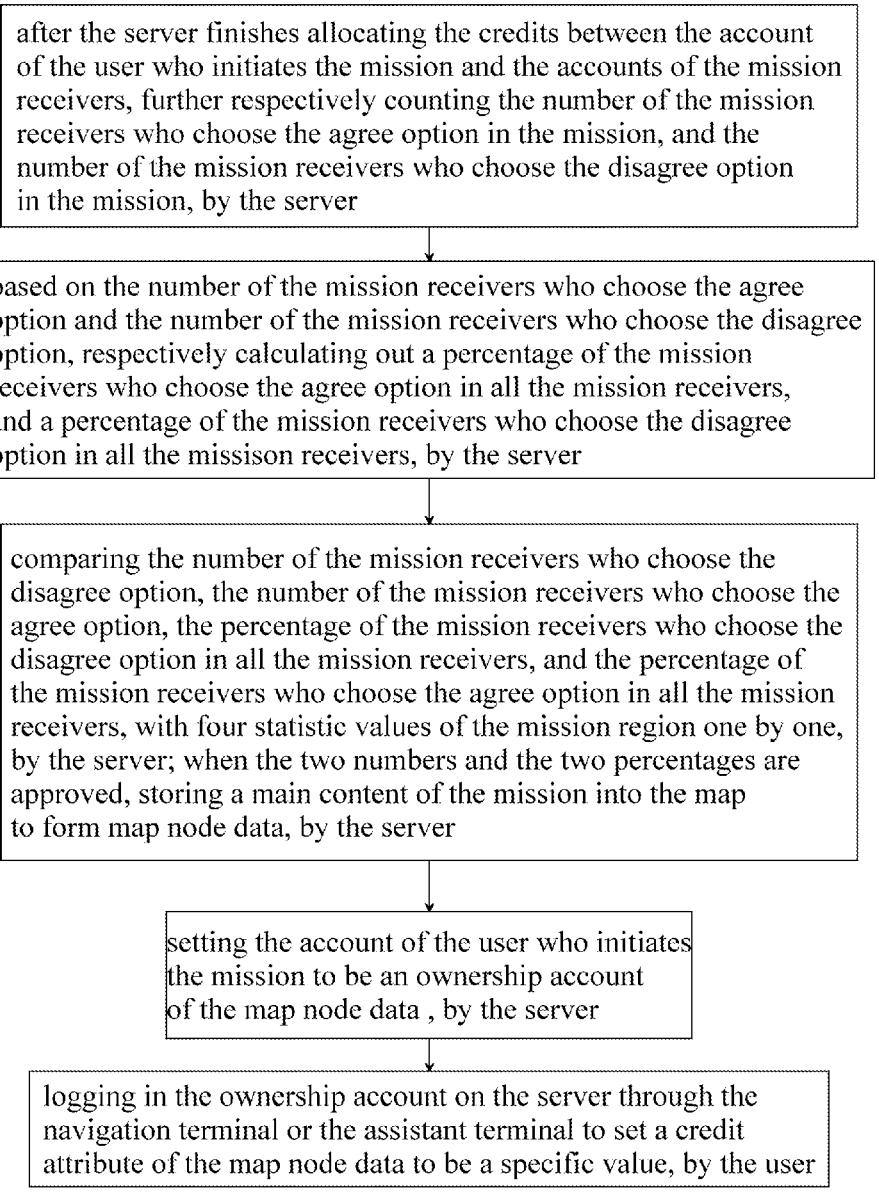
FIG. 13 is a flow chart of generating private data according to the fourth preferred embodiment of the present invention.

According to the fourth preferred embodiment of the present invention, based on the first preferred embodiment, after the server finishes allocating the credits between the account of the user who initiates the mission and the accounts of the mission receivers, the interactive dynamic cloud navigation system generates private data. As shown in FIG. 13, after the server 1 finishes allocating the credits between the account of the user 3 who initiates the mission and the accounts of the mission receivers 311, the server 1 further respectively counts the number of the mission receivers 311 who choose the agree option 93 in the mission 9, and the number of the mission receivers 311 who choose the disagree option 94 in the mission 9. Based on the number of the mission receivers 311 who choose the agree option 93 and the number of the mission receivers 311 who choose the disagree option 94, the server 1 respectively calculates out a percentage of the mission receivers 311 who choose the agree option 93 in all the mission receivers 311, and a percentage of the mission receivers 311 who choose the disagree option 94 in all the mission receivers 311. With the number of the mission receivers 311 who choose the disagree option 94, the number of the mission receivers 311 who choose the agree option 93, the percentage of the mission receivers 311 who choose the disagree option 94 in all the mission receivers 311, and the percentage of the mission receivers 311 who choose the agree option 93 in all the mission receivers 311, the server 1 compares with four statistic values of the mission region one by one. When the two numbers and the two percentages are approved, the server further stores the main content 95 of the mission into the map 11 to form the map node data; the server also sets the account of the user who initiates the mission to be the ownership account of the map node data. The user logs in the ownership account on the server through the navigation terminal or the assistant terminal to set the credit attribute of the map node data to be a specific value.

As shown in Table 3, the four statistic values are a combination of statistic values which is set by the server 1 for each region of the map 11.

TABLE 3

| | four statistic values | |
| --- | --- | --- |
| | Agree option 93 | Disagree option 94 |
| Count statistics | When the server stores the main content 95 of the mission into the map 11, a smallest number of the mission receivers who choose the agree option 93 | When the server stores the main content 95 of the mission into the map 11, a largest number of the mission receivers who choose the disagree option 94 |
| Proportional statistics | When the server stores the main content 95 of the mission into the map 11, a smallest percentage of the mission receivers who choose the agree option 93 in all the mission receivers | When the server stores the main content 95 of the mission into the map 11, a largest percentage of the mission receivers who choose the disagree option 94 in all the mission receivers |

When the number of the mission receivers who choose the agree option 93 is larger than the count statistics of the agree option 93, the number of the mission receivers who choose the agree option 93 is approved.

When the number of the mission receivers who choose the disagree option 94 is smaller than the count statistics of the disagree option 94, the number of the mission receivers who choose the disagree option 94 is approved.

When the percentage of the mission receivers who choose the agree option 93 in all the mission receivers is larger than the proportional statistics of the agree option 93, the percentage of the mission receivers who choose the agree option 93 in all the mission receivers is approved.

When the percentage of the mission receivers who choose the disagree option 94 in all the mission receivers is smaller than the proportional statistics of the disagree option 94, the percentage of the mission receivers who choose the disagree option 94 in all the mission receivers is approved.

Besides, the map operator 5 is further for empowering the user 3 to be entitled to directly upload the data which are stored into the map 11 by the server 1 after the map operator 5 logs in the management account 7 on the server 1, so as to form an empowered user 33. The empowered user 33 uploads the map node data to the server 1 through the navigation terminal 2 or the assistant terminal 6 corresponding to the empowered user 33; then, the server 1 directly stores the map node data into the map 11. Moreover, the server 1 sets the account 4 of the empowered user 33 to be the ownership account of the map node data.

When the users 3, except the empowered user 33, intends to add the data into the map 11, the users 3 except the empowered user 33 have to initiate the mission 9 comprising the agree option 93 and the disagree option 94. The mission receives 311 corresponding to the mission 9 selects one of the agree option 93 and the disagree option 94, which generates the feedback data of the mission which are uploaded to the server. The server counts the number of the mission receivers who choose the agree option 93 and the number of the mission receivers who choose the disagree option 94, and respectively calculates out the percentages thereof in all the mission receivers. The server compares the two numbers and the two percentages with the statistics combination of the mission region; when the two numbers and the two percentages are approved, the server stores the main content 95 of the mission into the map 11. When the mission initiated by the user does not need to be stored into the map 11, the user can refuse to introduce the agree option 93 and the disagree option 94 into the mission when initiating the mission.

Figure 14:
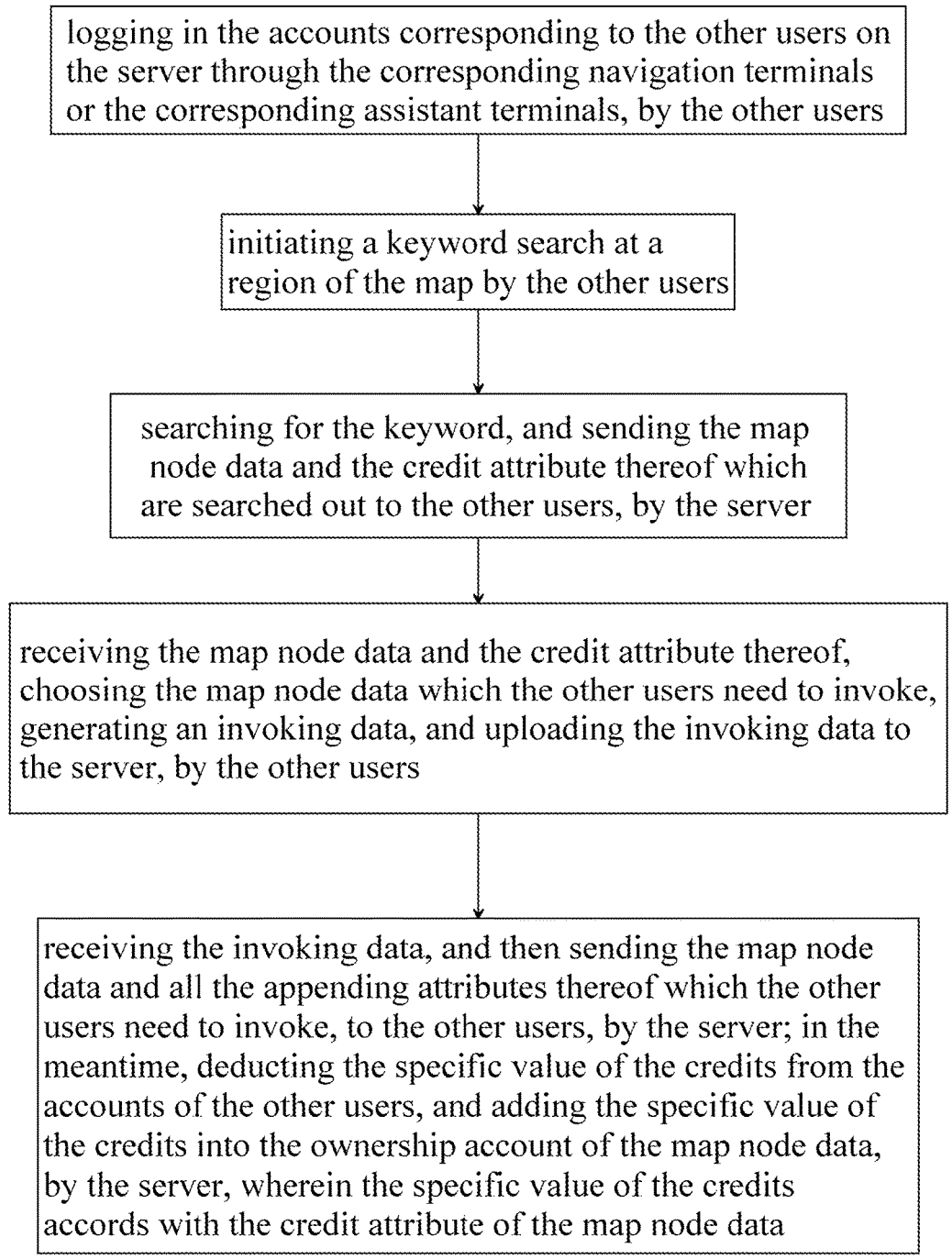
FIG. 14 is a flow chart of invoking the private data according to the fourth preferred embodiment of the present invention.

According to the fourth preferred embodiment of the present invention, as shown in FIG. 14, based on the generation of the private data, in the interactive dynamic cloud navigation system, the private data are invoked by the other users as follows. The other users log in the accounts thereof on the server through the navigation terminals or the assistant terminals; the other users initiate a keyword search at a region of the map 11; the server searches for the keyword, and sends the map node data and the credit attribute thereof which are searched to the other users. The other users receive the map node data and the credit attribute thereof, choose the map node data which the other users need to invoke, generate an invoking data and upload the invoking data to the server. The server receives the invoking data, and then sends the map node data and all the appending attributes thereof which the other users need to invoke to the other users. In the meantime, the server deducts the specific value of the credits from the accounts of the other users, and adds the specific value of the credits into the ownership account of the map node data. The specific value of the credits accords with the credit attribute of the map node data.

The server is further for sending the map node data to the other users who need to invoke the map node data, and establishing a data transmission channel between the accounts of the other users and the ownership account of the map node data, for a data transmission among the different accounts 4.

In order to explain and illustrate generating and invoking the private data, according to a fifth preferred embodiment of the present invention, in the interactive dynamic cloud navigation system, a user M wants to add a position of a charging pile for electric vehicles into the map 11.

The user M has a home address of Number 2 Street B, City A. The user M wants to share the charging pile at home with others. The user M accomplishes sharing the charging pile at home as follows. (1) The user M logs in the account on the server through the assistant terminal and finds the position of Number 2 Street B, City A, on the map. (2) The user M initiates the mission and uploads the mission to the server, wherein the mission comprises:

Mission region: Number 2 Street B, City A;

Type of mission affiliates corresponding to the mission and threshold value: type (2), 50 times; in other words, choosing the users who appears at Number 2 Street B, City A, for more than 50 times as the mission affiliates;

Main content 95 of the mission: request for adding a map node data-a charging pile for electric vehicles at Number 2 Street B, City A, on the map;

Rewarding credits 96 of the mission: 180 credits;

Effective period 91 of the mission: 24 hours; and

Agree option 93 and disagree option 94 introduced by the user M.

(3) The user analyzes the GPS tracks of all the users, calculates out the users who appear at Number 2 Street B City A for more than 50 times who are chosen as the mission affiliates, and randomly selects 20 persons out of the mission affiliates as the mission receivers. (4) The server sends the mission to the 20 mission receivers. (5) The 20 mission receivers receive the mission.

(6) Within 24 hours, 10 mission receivers select the agree option 93 after observation and inspection at the address and upload the feedback data to the server; 5 mission receivers who know that the charging pile exist at the address readily select the agree option 93 and upload the feedback data to the server; 3 mission receivers select the disagree option 94 against the truth, out of prank, and upload the feedback data to the server; 2 mission receivers fail to upload any feedback data to the server.

(7) The server receives the feedback data from 18 mission receivers, and stores the mission and the feedback data into the database; meanwhile, the server sends the mission and the feedback data to the user M for confirmation. (8) The user M confirms the finish of the mission, and then, the server evenly distributes the 180 credits among the 18 receivers who upload the feedback data, wherein each receiver wins 10 credits. (9) The server counts and calculates the feedback data uploaded by the mission receiver, and compares the two numbers and the two percentages with the statistics combination set by the server for the city A one by one; when the two numbers and the percentages are approved, the server stores the map node data—the charging pile for the electric vehicles into Number 2 Street B, City A, of the map 11.

(10) The user M sets the credit attribute of the map node data—the charging pile for the electric vehicles to be 10 credits; the user M also adds the text attribute, for further illustrating charging steps and charging password needed to be inputted. (11) A user N drives the electric vehicle and arrives at the city A running out of electricity. The user N logs in the account thereof on the server through the navigation terminal of the user N, and initiates the search for the key word "charging pile" in the city A. (12) The server sends the user N information about all the charging piles and the credits attribute thereof, which are searched out. (13) Among the information about all the charging piles, the user N chooses the map node data—the charging pile for the electric vehicles at Number 2 Street B, City A. (14) The server responds to the choice of the user N, and sends the user N the charging pile at Number 2 Street B, City A, and all the appending attributes thereof. (15) The server deducts 10 credits from the account of the user N, and awards the account of the user M with 10 credits.

According to the fifth preferred embodiment of the present invention, the interaction among the users and the process of invoking the private data by the users in the interactive dynamic cloud navigation system are executed in a credit payment management manner of finishing the mission interaction or invoking the data before paying the credits. Based on practical situations in different countries or regions, paying the credits can be embodied to precede finishing the mission interaction or invoking the data.

Among the seven types of the mission affiliates, the interactive dynamic cloud navigation system can choose partial types for the user interaction according to the practical situations in the different countries or regions.

In order to simplify the steps of initiating the mission by the user, according to a sixth preferred embodiment of the present invention, the server 1 is further for storing templates of mission parameters into the database 12 according to functions of the mission. The templates comprise all the parameters of the mission except the main content 95 of the mission and the data of the mission region. When the user initiates the mission directly, the user introduces the template directly according to the function, selects the mission region and inputs the main content of the mission, thereby rapidly and conveniently initiating the mission.

According to a seventh preferred embodiment of the present invention, an interactive dynamic cloud navigation system comprises:

a server 1, comprising a database 12, wherein a map 11 and a plurality of accounts 4 are stored in the database 12;

a plurality of navigation terminals 2 and a plurality of users 3 respectively corresponding to the navigation terminals 2, wherein: each the user 3 logs in the account 4 corresponding to the user 3 on the server 1 through the navigation terminal 2 corresponding to the user 3, and uploads a navigation path request which corresponds to the map 11 and contains coordinates data of a departure region and a destination region, to the server 1; each the navigation terminal 2 comprises a data collection module 21, a first data storage module 22, a first transmission module 23, and a first input and output module 24; the data collection module 21 comprises a GPS chip; the data collection module 21 is for collecting data; the first data transmission module 23 is for data transmission between the navigation terminal and the server; the first data storage module 22 is for storing the data; the first input and output module 24 is for receiving an input from the user 3 and outputting the data stored in the navigation terminal 2 to the user 3; according to the data collection module 21, the first data storage module 22 and the first data transmission module 23, the server 1 records a geographic position of each user 3 corresponding to the navigation terminal 2 and a time in real time, and stores the geographic position of the user 3 and the time into the database 12; and a plurality of assistant terminals 6, respectively corresponding to the plurality of the users 3, wherein: each the user 3 logs in the account 4 corresponding to the user 3 on the server 1 through the assistant terminal 6 corresponding to the user 3, to initiate the navigation path request; each the assistant terminal 6 comprises a second data storage module 61, a second data transmission module 62, and a second input and output module 63; the second data transmission module 62 is for the data transmission between the assistant module 6 and the server 1; the second data storage module 61 is for storing the data; the second input and output module 63 is for receiving the input from the user and outputting the data stored in the assistant terminal 6 to the user;

wherein the user 3 uploads the navigation path request to the server 1 through the first data transmission module 23 or the second data transmission module 62; the server 1 receives the navigation path request, and respectively calculates out the mission affiliates 31 corresponding to the departure region and the mission affiliates 31 corresponding to the destination region from all the users 3.

The mission affiliates comprise at least one of the following five types of users: (1) the user who appears in the mission region more than certain times; (2) within a period of time, the user who accumulatively stays in the mission region longer than a duration; (3) the user who appears in the mission region at a timing within a certain time lag from a timing when the mission is initiated; (4) the user whose geographic position is within a certain distance from a center of the mission region; and (5) the user who appears in the mission region slower than a certain speed.

The server 1 calculates out an intersection of the mission affiliates corresponding to the departure region and the mission affiliates corresponding to the destination region. Further, the server 1 analyzes the GPS tracks of the mission affiliates, and statistics of the paths which are used to drive by the mission affiliates who belong to the intersection of the mission affiliates corresponding to the departure region and the destination region. The server 1 feeds the path which is adopted the most by the mission affiliates of the intersection or the path which costs the least time by the mission affiliates of the intersection, among all the motion paths, to the user who initiates the navigation path request.

It is worth to mention that the certain times, the duration, the certain period, the certain distance and the certain speed respectively in the five types of the users are the mission parameters within the navigation template defined by the server. Selecting the navigation template, the departure region and the destination region are executed to initiate the navigation path request.

Further, when the server 1 calculates and screens out zero mission affiliate 31, the server 1 expands the mission region by a certain ratio, and calculates and screen out the mission affiliates again, until the mission affiliate is no longer zero.

One skilled in the art will understand that the embodiment of the present invention as shown in the drawings and described above is exemplary only and not intended to be limiting.

It will thus be seen that the objects of the present invention have been fully and to effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An interactive dynamic cloud navigation system, comprising:

a server, comprising a database, wherein the database stores a map, a management account and a plurality of accounts;

a plurality of navigation terminals and a plurality of users corresponding to the plurality of the navigation terminals, wherein: each user logs in the corresponding account on the server through the corresponding navigation terminal, for initiating a mission which corresponds to a region of the map; each navigation terminal comprises a data collection module, a first data storage module, a first data transmission module, and a first input and output module; the data collection module, for collecting data, comprises a Global Position System (GPS) chip; the first data transmission module is for transmitting the data between the navigation terminal and the server; the first data storage module is for storing the data; the first input and output module is for receiving an input of the user and for outputting to the user the data stored in the navigation terminal; through the data collection module, the first data storage module and the first data transmission module, the server records in real-time a geographic position of each user corresponding to the navigation terminal and a time, and stores the geographic position and the time in the database; and a map operator which logs in the management account on the server for managing the database; and further comprising a plurality of assistant terminals, respectively corresponding to the plurality of the users, wherein: each user logs in the corresponding account on the server through the corresponding assistant terminal, for initiating the mission; each assistant terminal comprises a second data storage module, a second data transmission module, and a second input and output module; the second data transmission module is for transmitting the data between the assistant terminal and the server; the second data storage module is for storing the data; and, the second input and output terminal is for receiving the input of the user and outputting to the user the data stored in the assistant terminal;

wherein the user uploads the mission to the server through the first data transmission module or the second data transmission module; the server receives the mission, and then calculates and screens out mission affiliates corresponding to the mission, from all of the users, according to the region to which the mission corresponds;

wherein the mission affiliates comprise at least one of the following seven types of users:

(1) the user who actively acknowledges familiarity with a mission region by marking out a familiar region on the map when logging in the account thereof on the server through the corresponding navigation terminal or assistant terminal, wherein: the mission region is the region of the map to which the mission corresponds, and the familiar region of the user comprises the mission region;

(2) the user who accumulatively appears in the mission region more than certain times, wherein the certain times is a threshold value of the type (2);

(3) within a period of time, the user who accumulatively stays in the mission region longer than a duration, wherein the duration is the threshold value of the type (3);

(4) the user who appears in the mission region at a timing, wherein a time lag between a timing when the mission is initiated and the timing when the user appears in the mission region is less than a value; the value is the threshold value of the type (4);

(5) the user whose geographic position is within a certain distance from a center of the mission region, wherein the certain distance is the threshold value of the type (5);

(6) the user who appears in the mission region at a speed slower than a certain speed, wherein the certain speed is the threshold value of the type (6); and (7) the user who is empowered by the map operator to be a mission affiliate corresponding to a certain region of the map, wherein the certain region of the map comprises the mission region.

2. The interactive dynamic cloud navigation system, as recited in claim 1, wherein: the server is further for selecting out mission receivers corresponding to the mission from the mission affiliates, and sending the mission to the mission receivers; the mission receiver receives and executes the mission through the corresponding navigation terminal or the corresponding assistant terminal, generates feedback data of the mission, and uploads the feedback data to the server, so as to accomplish the mission.

3. The interactive dynamic cloud navigation system, as recited in claim 2, wherein the server randomly selects out the mission receivers from the mission affiliates corresponding to the mission.

4. The interactive dynamic cloud navigation system, as recited in claim 2, wherein: the server selects out the mission receivers from a ranking list; and, the server calculates a product of a feature value of each mission affiliate and a weighted coefficient of the type to which the mission affiliate belongs, and ranks the mission affiliates according to the products to form the ranking list, wherein the products serve as scores in the ranking list.

5. The interactive dynamic cloud navigation system, as recited in claim 4, wherein: the server is further for calculating the score of the user who simultaneously belongs to at least two types of the mission affiliates, which is a sum of the products respectively calculated for each of the at least two types of the mission affiliates which the user simultaneously belongs to.

6. The interactive dynamic cloud navigation system, as recited in claim 2, wherein: each account comprises a username, a main password and an auxiliary password; the username is a unique identification code required for uploading or downloading the data by the user who logs on the server through the corresponding navigation terminal or the corresponding assistant terminal; the main password is a first key which the user needs to input when the user logs on the server through the corresponding navigation terminal or the corresponding assistant terminal; when the user inputs the username and the main password through the corresponding navigation terminal or the corresponding assistant terminal to log in the account on the server, the user is entitled to edit, manage and browse real information of the account, and to initiate or receive the mission through the account; the auxiliary password is a second key which the user needs to input when the user logs on the server through the corresponding navigation terminal or the corresponding assistant terminal; when the user inputs the username and the auxiliary password through the corresponding navigation terminal or the corresponding assistant terminal to log in the account on the server, the user is entitled to edit, manage and browse fake information of the account, and to initiate or receive the mission through the account.

7. The interactive dynamic cloud navigation system, as recited in claim 2, wherein: the server is further for receiving the feedback data, and sending the feedback data to the user who initiates the mission; the user who initiates the mission confirms a finish of the mission, generates mission confirmation data, and uploads the mission confirmation data to the server; the server receives the mission confirmation data, and stores the mission and the feedback data into the database; the server sets the mission to expire, and allocates credits between the account of the user who initiates the mission and the accounts of the mission receivers.

8. The interactive dynamic cloud navigation system, as recited in claim 7, wherein: after the server sends the mission to the mission receivers and before the server receives confirmation data and sets the mission to expire, the navigation terminal or the assistant terminal is further for logging on the server by the other users and initiating a data search on the server to search out the mission; the server sends to the other users, the mission which is searched out and two options of sharing credits and adding credits, as two manners for joining the mission; the other users choose the mission and one of the two manners for joining the mission provided by the navigation terminal or the assistant terminal, generate application data and upload the application data to the server;

the server is further for sending the feedback data of the mission to the other users after the user who initiates the mission uploads the confirmation data to the server and before the server sets the mission to expire; and the server is further for allocating the credits among the accounts corresponding to the other users, the account of the user who initiates the mission and the accounts of the mission receivers, according to the manner for joining the mission chosen by the other users.

9. The interactive dynamic cloud navigation system, as recited in claim 2, wherein: after the mission receiver receives the mission through the corresponding navigation terminal or the corresponding assistant terminal, the mission receiver transfers the mission to the account of a contact in a contact list of the mission receiver; the contact logs in the account thereof on the server through the navigation terminal or the assistant terminal thereof to receive the mission; and then, the contact executes the mission, generates the feedback data of the mission, and uploads the feedback data to the server, so as to accomplish the mission; wherein:
the contact list is a storage space in the account of the user where usernames of contacts of the user are stored; the contacts are the other users who agree to establish connection via a bilateral confirmation.

10. The interactive dynamic cloud navigation system, as recited in claim 1, wherein: after the user logs in the account thereof on the server through the corresponding navigation terminal or the corresponding assistant terminal, the user selects a mission region to generate coordinates, wherein the mission region is the region of the map to which the mission corresponds; from the seven types of the mission affiliates, selects the types to which the mission is related; from four logic calculation symbols, selects out a logic calculation relationship for the several types, wherein the four logic calculation symbols are AND, OR, NOT and XOR; inputs and edits a paragraph of texts or an audio, to generate a main content of the mission; sets rewarding credits of the mission, so as to initiate the mission.

11. The interactive dynamic cloud navigation system, as recited in claim 10, wherein: the user selects merely one type to which the mission is related when the user initiates the mission; after the server receives the mission, the server obtains the mission region and the one type to which the mission is related; the server analyzes GPS track of all the users based on the database, and calculates out the one type of the mission affiliates, so as to obtain the mission affiliates corresponding to the mission.

12. The interactive dynamic cloud navigation system, as recited in claim 10, wherein: the user selects more than one types to which the mission is related when the user initiates the mission; after the server receives the mission, the server obtains the mission region, the more than one types to which the mission is related and the logic calculation relationship for the several types; the server analyzes GPS tracks of all the users based on the database, and respectively calculates out each type of the mission affiliates corresponding to the mission; and then, according to the logic calculation relationship, the server executes a logic calculation upon the more than one types of the mission affiliates, so as to obtain the mission affiliates corresponding to the mission.

13. The interactive dynamic cloud navigation system, as recited in claim 10, wherein the user further introduces an agree option and a disagree option, so as to initiate the mission.

14. The interactive dynamic cloud navigation system, as recited in claim 13, wherein: the server further respectively counts the number of the mission receivers who choose the agree option, and the number of the mission receivers who choose the disagree option; based on the number of the mission receivers who choose the agree option and the number of the mission receivers who choose the disagree option, the server respectively calculates out a percentage of the mission receivers who choose the agree option in all the mission receivers, and a percentage of the mission receivers who choose the disagree option in all the mission receivers; with the number of the mission receivers who choose the disagree option, the number of the mission receivers who choose the agree option, the percentage of the mission receivers who choose the disagree option in all the mission receivers, and the percentage of the mission receivers who choose the agree option in all the mission receivers, the server compares with four statistic values of the mission region one by one; when the two numbers and the two percentages are approved, the server further stores the main content of the mission into the map to form map node data; and the four statistic values comprise two count statistics and two proportional statistics; wherein:
the two count statistics comprise a smallest number of the mission receivers who choose the agree option when the server stores the main content of the mission into the map, and a largest number of the mission receivers who choose the disagree option when the server stores the main content of the mission into the map; and
the two proportional statistics comprise a smallest percentage of the mission receivers who choose the agree option in all the mission receivers when the server stores the main content of the mission into the map, and a largest percentage of the mission receivers who choose the disagree option in all the mission receivers when the server stores the main content of the mission into the map.

15. The interactive dynamic cloud navigation system, as recited in claim 14, wherein: the server is further for setting the account of the user who initiates the mission to be an ownership account of the map node data.

16. An interactive dynamic cloud navigation system, comprising:
a server, comprising a database, wherein a map and a plurality of accounts are stored in the database;
a plurality of navigation terminals and a plurality of users respectively corresponding to the plurality of the navigation terminals, wherein: each user logs in the account thereof on the server through the corresponding navigation terminal, and uploads map node data corresponding to the map to the server; each navigation terminal comprises a data collection module, a first data storage module, a first data transmission module, and a first input and output module; the first data transmission module is for transmitting data between the navigation terminal and the server; the first data storage module is for storing the data; the first input and output module is for receiving an input the user and outputting the data stored in the navigation terminal to the user;
a plurality of assistant terminals, respectively corresponding to the plurality of the users, wherein: each user logs in the account thereof on the server through the corresponding assistant terminal to upload the map node data corresponding to the map to the server; each assistant terminal comprises a second data storage module, a second data transmission module, and a second input and output module; the second data transmission module is for transmitting the data between the assistant terminal and the server; the second data storage module is for storing the data; the second input and output module is for receiving the input of the user and outputting the data stored in the assistant terminal to the user; and
a map operator, for empowering the user to be entitled to directly upload the data which are stored into the map by the server after the map operator logs in the management account on the server, so as to form an empowered user; the empowered user uploads the map node data to the server through the navigation terminal or the assistant terminal corresponding to the empowered user; then, the server directly stores the map node data into the map; the server sets the account of the empowered user to be an ownership account of the map node data.

17. The interactive dynamic cloud navigation system, as recited in claim 15 or claim 16, wherein: the server is further for sending the map node data to the other users who needs to invoke the map node data, or for establishing a data transmission channel between the accounts of the other users and the ownership account corresponding to the map node data, for data transmission among different accounts.

18. The interactive dynamic cloud navigation system, as recited in claim 17, wherein the server is further for allocating credits between the accounts of the other users and the ownership account.

19. An interactive dynamic cloud navigation system, comprising:
a server, comprising a database, wherein a map and a plurality of accounts are stored in the database;
a plurality of navigation terminals and a plurality of users respectively corresponding to the navigation terminals, wherein: each the user logs in the account corresponding to the user on the server through the navigation terminal corresponding to the user, and uploads a navigation path request which corresponds to the map and contains coordinates data of a departure region and a destination region, to the server; each the navigation terminal comprises a data collection module, a first data storage module, a first transmission module, and a first input and output module; the data collection module comprises a GPS chip; the data collection module is for collecting data; the first data transmission module is for transmitting the data between the navigation terminal and the server; the first data storage module is for storing the data; the first input and output module is for receiving an input from the user and outputting the data stored in the navigation terminal to the user; according to the data collection module, the first data storage module and the first data transmission module, the server records a geographic position of each user corresponding to the navigation terminal and a time in real time, and stores the geographic position of the user and the time into the database; and
a plurality of assistant terminals, respectively corresponding to the plurality of the users, wherein: each the user logs in the account corresponding to the user on the server through the assistant terminal corresponding to the user, to initiate the navigation path request; each the assistant terminal comprises a second data storage module, a second data transmission module, and a second input and output module; the second data transmission module is for transmitting the data between the assistant module and the server; the second data storage module is for storing the data; the second input and output module is for receiving the input from the user and outputting the data stored in the assistant terminal to the user; wherein:
the user uploads the navigation path request to the server through the first data transmission module or the second data transmission module; the server receives the navigation path request, and respectively calculates out the mission affiliates corresponding to the departure region and the mission affiliates corresponding to the destination region from all the users;
the mission affiliates comprise at least one of the following five types of users: (1) the user who appears in the mission region more than certain times; (2) within a period of time, the user who accumulatively stays in the mission region longer than a duration; (3) the user who appears in the mission region at a timing within a certain time lag from a timing when the mission is initiated; (4) the user whose geographic position is within a certain distance from a center of the mission region; and (5) the user who appears in the mission region slower than a certain speed; and
the server calculates out an intersection of the mission affiliates corresponding to the departure region and the mission affiliates corresponding to the destination region; further, the server analyzes GPS tracks of the mission affiliates, and statistics of the paths which are used to drive by the mission affiliates who belong to the intersection of the mission affiliates corresponding to the departure region and the destination region; the server feeds the path which is adopted the most by the mission affiliates of the intersection or the path which costs the least time by the mission affiliates of the intersection, among all the motion paths, to the user who initiates the navigation path request.

20. The interactive dynamic cloud navigation system, as recited in claim 1 or 19, wherein: when the server calculates and screens out zero mission affiliate, the server expands the mission region proportionally, and calculates and screen out the mission affiliates again, until the mission affiliate is no longer zero.

* * * * *